(12) United States Patent
Simeonov

(10) Patent No.: US 9,135,629 B2
(45) Date of Patent: Sep. 15, 2015

(54) USER TARGETING MANAGEMENT, MONITORING AND ENFORCEMENT

(76) Inventor: Simeon S. Simeonov, Lincoln, MA (US)

(*) Notice: Subject to any disclaimer, the term of this patent is extended or adjusted under 35 U.S.C. 154(b) by 0 days.

(21) Appl. No.: 12/821,805

(22) Filed: Jun. 23, 2010

(65) Prior Publication Data

US 2011/0022681 A1 Jan. 27, 2011

Related U.S. Application Data

(60) Provisional application No. 61/219,515, filed on Jun. 23, 2009.

(51) Int. Cl.
*G06F 15/16* (2006.01)
*G06Q 30/02* (2012.01)

(52) U.S. Cl.
CPC .................................. *G06Q 30/02* (2013.01)

(58) Field of Classification Search
USPC ................... 709/217; 705/14.4, 14.49, 14.55
See application file for complete search history.

(56) References Cited

U.S. PATENT DOCUMENTS

| | | | |
|---|---|---|---|
| 6,950,804 B2* | 9/2005 | Strietzel ........................ | 705/26.8 |
| 2005/0193093 A1* | 9/2005 | Mathew et al. ................. | 709/219 |
| 2006/0041477 A1* | 2/2006 | Zheng ............................ | 705/14 |
| 2009/0106349 A1* | 4/2009 | Harris ........................... | 709/203 |
| 2010/0323716 A1* | 12/2010 | Jaffri .......................... | 455/456.1 |

OTHER PUBLICATIONS

Cranor et al., The Platform for Privacy Preferences 1.1 (P3P1.1) Specification, Nov. 13, 2006, W3C Working Group, P3P 1.1.*

* cited by examiner

*Primary Examiner* — Hee Soo Kim
(74) *Attorney, Agent, or Firm* — David H. Judson

(57) ABSTRACT

A scalable architecture for managing, monitoring and enforcing user ad targeting operates across a distributed network. The architecture enables defining and enforcement of policy related to targeting across various domains, platforms, devices, protocols, interactions, content and media types. Targeting decisions utilize user policy as well as profile information. A user policy or portions thereof may be discovered and accessed without requiring direct interactions. The architecture provides a simple and extensible notion of policy scoping, provides an abstract processing model for determining actions related to interactions involving multiple policies, provides for time-limited in addition to use-limited ways to use policy and profile information, provides a set of discovery services that automate policy and profile discovery within and without the context of a targeting interaction, provides a coherent set of monitoring and enforcement strategies for policies, profiles and targeting, provides for easy integration with privacy-safe targeting, and provides scalable behavioral targeting opt-out.

3 Claims, 2 Drawing Sheets

USER TARGETING MANAGEMENT, MONITORING AND ENFORCEMENT

This application is based on and claims priority to Ser. No. 61/219,515, filed Jun. 23, 2009.

BACKGROUND

Advertisers want to reach a highly-targeted audience at scale. Effective targeting of advertising or content or product offers typically requires tracking aspects of consumer behavior (visits to sites, content views, purchases, geo-location, etc.) combined with building, maintaining and using profiles of consumer behavior. These operations sometimes carry serious privacy concerns.

The urgency of the situation globally has grown as consumers are having an unprecedented personal relationship with devices, from PCs to iPhones. The technologies for targeting and tracking of consumers are getting more sophisticated. The advertising value chain across all channels is getting longer and more complex.

The prior art has focused generally on several different areas: do not contact databases, opt-out programs, opt-in programs, the Platform for Privacy Preferences Project (P3P), and privacy proxies.

Do not contact databases have been used in the traditional mail and phone direct marketing space with some success. They rely on the presence of natural unique identifiers (name+address or a phone number). They are not applicable to digital media where unique identifiers are not present. In addition, they are a very crude tool and do not allow for fine policy-level decisions about which type of information can be used in determining whether to contact a consumer or the types of offers a consumer is interested in.

A variation of the do not contact database is an opt-out program such as the one that allows users of Google services to opt out of behavioral targeting. In a common embodiment, opt-out programs are implemented on the Internet through opt-out cookies stored in consumers' browsers. This is a highly unreliable approach as cookies disappear due to expiration, software updates, cookie store resets and other factors.

Opt-in programs work well when there is a unique way to identify users. Otherwise, they are typically implemented using cookies, which has all the problems described above for opt-out programs.

According to Wikipedia, the Platform for Privacy Preferences Project, or P3P, is a protocol allowing websites to declare their intended use of information they collect about browsing users. Typically, P3P is a machine-readable translation of human readable policies about websites' data management practices. A website uses P3P to set up policies that state the intended uses of personal information that may be gathered from site visitors. Typically, using their browsers configuration mechanisms, consumers decide what personal information they will allow to be seen by the sites that they visit. When a user visits a site their browser will compare what personal information the user is willing to release, and what information the server wants to get—if the two do not match, the browser takes an action, for example block a tracking cookie.

Privacy proxies are a technical solution for maintaining complete or partial user anonymity online.

BRIEF SUMMARY

A scalable architecture for managing, monitoring and enforcing user ad targeting operates across a distributed network. The architecture enables defining and enforcement of policy related to targeting across various domains, platforms, devices, protocols, interactions, content and media types. Targeting decisions utilize user (consumer) policy as well as profile information. A user policy, or portions thereof, may be discovered and accessed without requiring direct interactions. The architecture provides a simple and extensible notion of policy scoping, provides an abstract processing model for determining actions related to interactions involving multiple policies, provides for time-limited in addition to use-limited ways to use policy and profile information, provides a set of discovery services that automate policy and profile discovery within and without the context of a targeting interaction, provides a coherent set of monitoring and enforcement strategies for policies, profiles and targeting, provides for easy integration with privacy-safe targeting, and provides scalable behavioral targeting opt-out.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
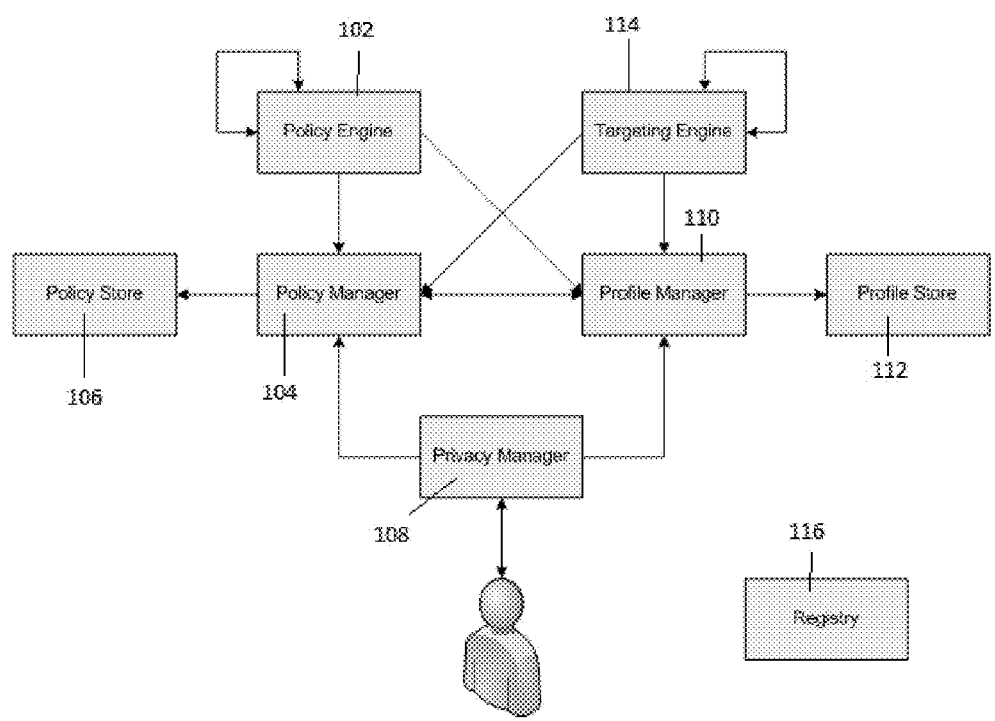
FIG. 1 depicts a high level extensible architecture in which exemplary aspects of the illustrative embodiments may be implemented.
Figure 2:
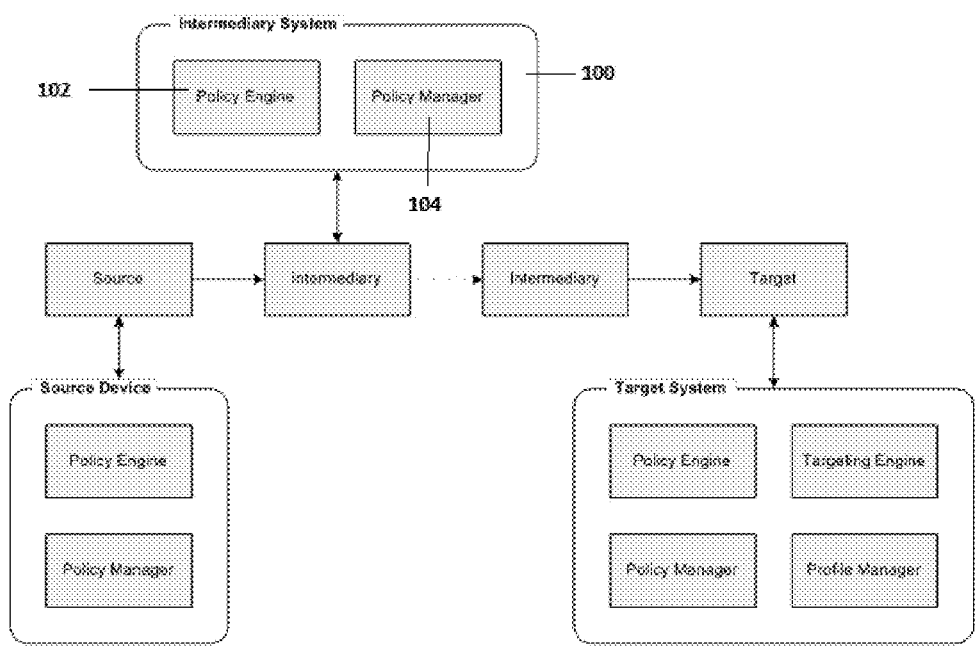
FIG. 2 depicts representative interactions within the architecture according to this disclosure.

With reference to FIGS. 1-2, the following definitions are useful in the context of the subject matter of this disclosure:

Affiliate. An organization that controls, is controlled by, or is under common control, with, another organization.

Control. Control of an organization typically means that an organization (a) is under significant ownership or operational control of another organization, or (b) has the power to exercise a controlling influence over the management or policies of the other organization. Control in our case also implies adherence to policies without material differences.

First Party. First Party is an entity that is the owner of an entity a consumer knowingly has visible interactions with or has Control over this entity and its Affiliate Web sites.

Intermediary 100. An entity (business or machine, program or process) that observes or participates in a targeting interaction between a consumer and a first party. For example, if a consumer accesses www.cnn.com from their browser at home, the browser, a privacy protection plugin in the browser, the anti-virus/spyware system on the consumer's PC that monitors HTTP traffic, the home router and the consumer's Internet access provider could be examples of intermediaries. In the case of a consumer sending an SMS message to a business, the consumer's mobile operator and any SMS aggregator(s) used by the mobile operator and the business could be examples of intermediaries.

Personally Identifiable Information ("PII"). Personally Identifiable Information is information about a specific individual including but not limited to: personal identity number (social security or something else), name, address, telephone number, and email address when tied to a particular individual.

Policy engine 102. A machine, program or process which takes part in determining how a targeting interaction would complete. A policy engine works with zero or more policy and profile stores (optionally via their managers) and zero or more policy engines.

Policy manager 104. A machine, program or process which optionally manages operations on one or more policy stores (optionally via their managers). In typical embodiments the policy manager allows policy stores to be accessed remotely with appropriate levels of security, availability, reliability and performance. Policy managers play an important role in the disclosed architecture as they allow the possibility of a user's policy to be discovered and retrieved by an entity under the right conditions without a specific interaction between the user and the entity. For example, an ad exchange may be given the right to know that a certain user has opted out of AdNetA and AdNetB but has opted into AdNetC, information which may significantly affect the outcome of a targeting interaction as well as may eliminate some of the need of frequent redirecting of ad targeting request in the case of Web sites. Policy managers may use protocols, such as XDI (eXtensible Data Interchange) and the like, to share, synchronize and link data between themselves and profile managers. They are preferably discoverable via a number of mechanisms including, but not limited to registries, XRDS, etc.

Policy store 106. The logical place where targeting policy information about an entity is kept. Embodiments can vary from a file or piece of data that is part of another application's setting to an entire system with multiple distributed and communicating components, databases, etc.

Privacy manager 108. A privacy manager preferably works with one or more policy and/or profile stores (optionally via their managers). In a common embodiment it allows users to manage configuration related to both policy and profile information. For example, a privacy manager may show a user that her profiles at AdNetA and AdNetB have settings that enable behavioral targeting and that AdNetB has her categorized as interested in baseball. The privacy manager then may allow the user to modify her policy such that she opts out of behavioral targeting with AdNetA, which would also modify her profile stored at AdNetA accordingly. It may also allow her to switch her category of interest from baseball to football with AdNetB, which would also modify her profile there. A privacy manager typically has user-facing UI. A user may use one or more privacy managers but in a preferred embodiment they use one which is provided as a service accessible across multiple channels (Web, mobile, set-top box, etc.). Privacy managers may use protocols such as XDI to share, synchronize and link data between themselves and profile managers. They are discoverable via a number of mechanisms including but not limited to registries, XRDS, etc.

Profile manager 110. The machine, program or process which optionally manages operations on one or more profile stores. In typical embodiments, the profile manager allows profile stores to be accessed remotely with appropriate levels of security availability, reliability and performance. Advantageously, this enables the sharing of data with targeting engines and other profile managers, for example, in the case of opt-in marketing where a user is willing to share certain data a-priori or as part of a targeting interaction. In addition, a profile manager can interact with a privacy manager to help a user understand what is known about them by certain parties and take appropriate action. Policy managers may use protocols such as XDI to share, synchronize and link data between themselves and policy managers. They are discoverable via a number of mechanisms including but not limited to registries, XRDS, etc.

Profile store 112. The logical place where profile information about consumers is kept. This is a logical construct that can be implemented in a number of ways, including through federation/aggregation of other stores. On a PC, for example, it may include the domain the PC operates out of, information from a digital wallet as well as, say, the interests of the user of the PC stored in some application.

Targeting engine 114. A machine, program or process which takes part in determining how a targeting interaction would complete. A targeting engine works with zero or more profile stores (optionally via profile managers) and zero or more policy stores (optionally via their policy managers) and targeting engines.

Targeting policy. Targeting policy (simply referred to as policy herein) is the collection of rules governing targeting interactions.

Profiles. Profiles (a.k.a., consumer profiles, user profiles) are collections of data relating to a person (or the device the person uses to access a service) used in targeting.

Registry 116. A registry is a machine, program or process, or a set of such functionalities communicating using agreed-upon protocols which allows for the registration, discovery and management of privacy managers, profile managers, policy managers, policy engines and targeting engines. Some registries are well-known entities. Registries can know of other registries, e.g., in a federation architecture similar to what UDDI registries use or the DNS system. Some registries may be well-known, e.g., safetargetingregistry.com. Others may leverage standards such as XRDS (eXtensible Resource Descriptor Sequence, or XRDS Simple.

Service Providers. A Service Provider typically is an entity that sees and may collect and use data from all or substantially all consumer interactions through a particular device. Examples include Internet access service providers, application makers (toolbar and plug-in providers, browser makers, or comparable desktop application or client software makers), mobile operators, SMS aggregators, cable and iTV providers, etc. Service Providers are intermediaries.

Targeting. The process of using profile information to make choices about advertising or content delivery based on profile information.

Third Party. An entity is a Third Party to the extent that it engages in targeting on non-Affiliate's places of presence (sites, applications, etc.).

As noted above, FIG. 1 shows the high-level architecture that applies to the disclosed subject matter, while Error! Reference source not found. shows interaction architecture. Arrows indicate the typical direction of communication. Some communication is one-way while other is two-way, special case of which is request-response as in the case of HTTP communications. Registries may connect to any manager or engine. There may be zero or one of every type of architectural element inside any entity. The interaction architecture diagram in FIG. 2 shows that not every participant in an interaction need implement all parts of the high-level architecture.

In theory, all participants in interactions have the same or similar architecture (at least internally), however, this is not a requirement. In practice, the various components of the high-level architecture may be implemented simply (hard-coded in software, for example) or not at all. The high-level architectural representation in this disclosure illustrates a simple, common model for user targeting management, monitoring and enforcement with significant advantages over prior art that applies equally across different environments yet can be implemented simply and efficiently for specific environments.

Typically, there are two types of participants in targeting interactions: active and passive. Passive participants may perform actions such as, for example, logging and reporting based on interaction context (any information available both directly and indirectly about the interaction) but they do not affect the outcome of the interaction. Active participants may or may not affect the outcome of a targeting interaction. Their effect is determined based on their place in the interaction flow and the outcome of their policy engine and targeting engine processing, which, in turn, is determined by the active policy, relevant profile data, interaction context and any user action. The notion of a common processing model for policies taught by this disclosure is a significant advancement compared to prior art.

Policy

Policy in this context refers to preferably machine readable or machine executable, i.e., code, representations of data related to how targeting interactions should occur. Given an abstract data structure, coming up with various representations that satisfy this requirement, e.g., XML or compiled code, and the processes for doing that, e.g., through standards organizations or the like, are known to those versed in the art. Therefore, this disclosure focuses on teaching the abstract data model governing policies.

P3P teaches how certain types of privacy policies can be versioned, described, extended, discovered and retrieved both before and during interactions. An addition, it teaches how policies can apply to different scopes within URL/URI space. However, P3P has a number of limitations.

According to this disclosure:

Preferably, policies are extendable to take into account common targeting practices in the industry, including but not limited to, behavioral targeting, geo-targeting, etc. In particular, it should be possible for an entity to describe whether it performs these types of targeting.

Preferably, policies and the mechanisms they use for discovery, retrieval, etc. are protocol-independent in general with zero or more specific protocol bindings per protocol.

Preferably, users have their own policies describing their preferences or requirements for participating in targeting interactions, at a minimum specifying opt-out and opt-in status within a certain scope. Scope can refer to entities, e.g., relative to certain targets, their affiliates and third parties, or location or other relevant restrictions.

Preferably, user policies are discoverable and retrievable. The policy could either be encoded directly in some way as part of an interaction or a "pointer" to it may be provided in some way. This can happen in a number of ways specific to the interaction protocol. For example, in the case of HTTP, this can happen via an HTTP request header with a URL that points to a location where the user policy can be downloaded. Other HTTP variations may include URL parameters, cookies, etc. In yet another embodiment, in the case of SMS messaging, the policy could be retrieved by taking an identifier associated with the user (the mobile number), using the help of a registry to determine which policy manager is responsible for the user's policy and making a request to that policy manager. In some embodiments such identifier may not be readily available and an additional interaction is necessary to generate it. For example, a Web ad network may issue an appropriately parameterized HTTP redirect pointing to one of a user's managers (policy, privacy or profile). When the user's browser requests a URL from the manager cookies or other information may be passed which allow the manager to identify the user. The manager can then take some action that communicates appropriate information back to the ad network via another appropriately parameterized redirect or other mechanisms. The above are merely representative implementation approaches, and there is no requirement that any particular approach be used.

Preferably, policy claims (statements/assertions) have expiration times. In particular, this allows users to specify limits on certain rights they grant or deny with respect to interactions.

Although policies can still be cached, preferably no policy is cached for longer than the earliest expiration time of a claim in a policy.

Preferably, an active policy includes the set of policies from multiple entities that apply to a targeting interaction. Preferably, two or more policies are combinable and policy engines operate on the combined policy set.

Preferably, protocol-specific encodings and references to policies allow for multiple policies to be included and/or referenced at any point in an interaction.

Preferably, the active policy set can be changed by intermediaries. When appropriate, they may modify embedded policies, change references to policies or include additional policies or references to such in the interaction. For example, a home router can modify all outgoing HTTP traffic to include opt-out cookies for certain ad networks or a header that request that adult content is not displayed.

Some policy claims may be directly encoded as part of interactions. The mechanism for how this happens should be described as part of the claim's supported encodings and protocol bindings. This need not happen in the same place as the claim. The Web services (SOAP, WSDL, etc.) protocol stack shows one example of how this can happen. For example, an opt-out or out-in claim can be directly encoded as an HTTP header, which will be included only in HTTP requests that fall within the scope of the claim.

Policy Support

In an illustrative embodiment, the data described in policies is logically grouped in sections called fragments. The same piece of data may belong to zero or more fragments. Fragments can include other fragments. Each fragment, in addition to its data, may have specific encodings and protocol bindings outside of a serialization of the fragment itself.

Fragments preferably have names in URI (IRI or XRI) space. The choice is implementation specific. Preferably, the system can determine whether a participant in a targeting interaction supports a certain policy fragment. This can happen either directly, by seeing an assertion to that effect or by accessing the participant's policy in some way or indirectly, for example, by common knowledge or by having a trusted entity make an assertion to this effect. In this manner, there is a way to show support of a policy without having to make web site modifications.

For example, the Organization for Safe Ad Targeting on the Web may require all members to comply with the behavioral targeting opt-out fragment developed by the organization. In addition to how compliance may be indicated during interactions, the organization may maintain a machine-readable registry of members that are in compliance and together with the URI spaces they manage as first parties. Policy engines may know to check that registry and cache this information to expedite processing. For interactions with entities that support the policy, the policy engine may then modify interaction context appropriately. For example, it may add an opt-out cookie with a particular name and value or a specially formatted HTTP header to indicate a user's opt-out status.

Preferably, policy fragments evolve independently. They do not require centralized standards development processes. For example, XML namespaces and XML schema allow for the independent evolution of XML fragments that may be mixed in the same XML document.

A policy engine may not be able to understand a policy fragment. In that case, the outcome is implementation-specific and may be affected by the policy engine's support of other fragments.

Policy Encoding and Protocol Binding

Policy encodings and protocol-bindings preferably are implementation-specific. Preferably, this can be done at both the entire policy as well as at the policy fragment level. However, care should be taken to ensure that both direct inclusion as well as indirect querying of policies is supported.

Further, whenever enabled by the protocol, it is desirable to have a mechanism for identifying multiple policies in the same interaction so that intermediaries can be supported. One possible approach is to have a single reference to a dynamic policy managed by a single policy manager such that intermediaries, rather an inserting additional policy fragments or references to such, augment the dynamic policy by communicating with the policy manager.

For example, an HTTP header identifying a policy in URI space would be a good implementation option as, differently from cookies, it can be sent to all URLs and it can support multiple policies.

Policy Processing

Policy processing preferably is governed by the active policy set, the interaction context and the policy engine. Some aspects of policy engine processing may be standardized. Some aspects may be implicitly governed by the prevailing regulatory climate and industry best practices.

Preferably, the first step in policy processing is to identify the policy engine. Next, the active policy set must be determined using known policy information and the interaction context. The active policy set varies at different times in an interaction. An example sequence in the case of a Web browser, orchestrated by the browser's policy engine, may be the following:

1. Identify active policy manager(s) for the user.
2. Send available interaction context (URL and cookies relevant to the domain) to policy manager(s) and retrieve active policies from it.
3. Based on interaction context, i.e., URL, retrieve server's policy. (see P3P for example mechanisms for doing this)
4. Generate active policy set.
5. Process active policy set.
6. Modify interaction context based on active policy set, e.g., adds opt-out header.
7. Browser makes HTTP request.
8. Browser receives HTTP response.
9. Look for additional policy information in interaction context.
10. Send to policy manager, if any. Retrieve additional information.
11. Generate active policy set.
12. Process active policy set.
13. Modify interaction context based on active policy set, e.g., reject a cookie.

In some cases, policy engines may need to communicate with multiple policy managers, some of which may not be on the same device as the policy engine. This enables aggregation of policy across devices. Of course, typical optimizations such as caching or multi-master data synchronization can be applied.

Profiles

Preferably, profiles are handled similarly to policies in terms of an abstract data model, fragments, encodings, protocol bindings, etc.

Some pieces of information may belong in both policies and profiles. For example, an opt-out or opt-in statement in a user's policy may have representation as opt-out and opt-in flags and other data in that user's profiles managed by various participants in targeting interactions.

Profile content and processing preferably are entity- and implementation-specific to a large extent. However, there are certain aspects of profiles, especially those referring to PII and industry-standard concepts such as opt-in, opt-out, visit lists/graphs, categories and keywords associated with the profile. Those would benefit from having a standardized representation which would make it easier for managers (privacy, profile and policy) and targeting engines to communicate. If there is no standardized representation, the various manager components can provide value-added functionality that enables interoperability.

Targeting Engines

Targeting engines vary hugely in purpose and implementation. This disclosure does not concern itself with their details but rather with where they are deployed and how they interact with other parts of the targeting ecosystem.

In one embodiment, a targeting engine is deployed on the user device and is under the control of the user. A user device-based targeting engine in association with architecture (and a processing model) that governs the interactions of the user-controlled targeting engine with other participants and components of the targeting interaction provides significant advantages.

For example, the techniques herein enables the discovery, though the user's policy, of the fact that the user device has a targeting engine with certain capabilities, e.g., showing ads from major ad networks based on interest categories provided by the user, which can be activated for targeting purposes under certain business arrangements, e.g., 80% rev share with targeting parties who allow the targeting engine to be activated instead of their own. Having discovered this fact, a targeting party may communicate via its own policy fragment when it accepts the activation of the user's targeting engine as well as provide its own set of business arrangement, e.g., restrictions on types of ads that can be shown around their content, settlement mechanism, etc. This type of policy negotiation leading to the selection of a targeting engine is advantageous.

Privacy-Safe Targeting

The privacy risks associated with ad and, to an extent, content targeting result from a diverse set of factors that ultimately boil down to the issues of tracking and profile building.

Tracking relates to the fact that in traditional advertising approaches various third parties that a user often has no relation with have the ability to recognize the user across multiple requests (pages, sites, etc.). Through tracking third parties can collect a stream of information based on user activities. Tracking is typically used for profile building.

Profile building describes the ability of these third parties to derive a set of information about the user. Typically, profiles are developed as a result of direct tracking of users. However, profiles can also be developed independently using a number of techniques such as third party database integration, capturing ad targeting information provided by the entity selling the ad space, etc. One of the most troubling parts of existing profile architectures is that there is no good way to ascertain which party ends up with which profile data. This typically happens due to profile leakage, a term referring to the fact that to execute a targeted ad request the requester, e.g., a Web publisher, may often send targeting information to the ad provider, e.g., an ad network, with the goal of receiving an ad that will monetize better. Therefore, the ad request itself reveals or leaks some profile information, e.g., gender, age range, interests, etc. to the ad provider.

A solution for ad targeting that claims to be privacy-safe has to address both tracking and profile building.

Addressing Tracking

To address the targeting issue at a fundamental level the ability of ad providers to track (through cookies in the web domain, for example) must be significantly limited. This can happens in one of two ways. If there is trust, it can happen contractually. If there is no trust, it happens through some type of proxying mechanism that would be protocol-specific and application architecture-specific.

It should be noted that a click (or other activation, e.g., an SMS response) to an ad may eventually take the user to a place controlled either by an advertiser or someone focused on ad delivery (ad network, exchange, etc.). At that point, little can be done to prevent these third parties from attempting to track user behavior. One approach is contractual. As above, compliance can be monitored through statistical testing. Another approach is to remove (de-parameterize) the target of engagement, e.g., have all differently targeted audience groups for the same campaign land on the same Web page.

The architecture is a significant improvement compared to the current state of affairs on at least two fronts. First, if a user does not engage with an ad, the user will not be tracked. Second, even if a user engages with an ad, there are ways to limit who ends up tracking the user.

Addressing Profile Building

The architecture described herein eliminates a host of issues typically related to current methods of ad targeting:

The entity which aggregates profile information is known. In the terminology of this application, it would be a profile manager.

Users could have a central and, in addition, per advertiser and/or ad provider, places where to opt in/opt out and review profiles. In the terminology of this application, it would be a combination of one or more policy and privacy managers.

Profile information never directly leaves the entity providing tracking and ad targeting, even during an ad targeting operation. Instead, audience certification assertions (ACAs) are used.

Because tracking is prevented in most cases, residual profile building by third parties is reduced to a minimum.

ACAs make campaigns potentially opaque to ad providers. For example, if an advertiser doesn't share that ACA1 which has a $30 CPM payout is related to a particular audience query, e.g., "male Hispanics in urban areas who have downloaded mobile games before", there is no way for the ad provider to get this information.

Security

Specific embodiments of the described architecture preferably use specific encodings and protocol bindings. Security based practices are applied to ensure appropriate levels of security and privacy control including but not limited to security assessments and regular audits of infrastructure and implementations, encryption of sensitive data, anonymization of PII when relevant, etc.

In addition, the set of policy or profile fragments exchanged between parties preferably varies based on who the parties are and on the security context. In particular, if an entity X requests the user's policy it need not be able to see statements related to entity Y. For example, if AdNetA what's to know a user's opt-out status it should not necessarily be able to also learn that the user has also opted out of AdNetC and AdNetF.

Monitoring and Enforcement

The architecture assumes that entities behave according to their policy. This may not always be the case. In some cases it may be desirable to monitor policy compliance. In other cases, it may be that one or more parties want to enforce certain policies against other parties.

Monitoring

Monitoring may be performed on an ongoing basis by sources, intermediaries and targets to determine compliance with policies. Some monitoring may be fully automated. For example, if a policy says that the target will not cookie the source if the source asks for that it is easy to check whether the target attempts to set cookies with HTTP responses. Other monitoring may require human involvement. For example, if an entity's policy states that it will not present users with adult content then the current state of the art will not allow for the full automation of the monitoring of such a policy. A human may have to flag content as adult.

It is desirable that failures to comply with policy are reported, ideally to one or more well-known and trusted entities whose focus in compliance. Their operations may involve maintaining records of compliance failures, processes for ensuring the validity of reports as well as engaging the entities involved in resolution, maintaining various rankings and other meta-data about entities and their compliance with policies.

Compliance entities may also engage in randomized testing of policy compliance. They may participate in interactions under assumed identities for the purposes of monitoring interactions and determining their compliance with policy. For example, in the case of the no cookie-ing policy, the compliance entity may operate a pool of virtual machines at different domains and IP address ranges and issue request from them to various targets (potentially all that are discoverable through registries to subscribe to this policy) to see whether they comply with it. Alternatively, in the case of the adult content policy, the compliance entity may issue requests to entities that support this policy and present the content retrieved by them to a microtask workforce. Statistical techniques may be applied in that environment to ensure a desired level of Type I and Type II errors. Another example leveraging humans for compliance would be to help advertisers monitor whether publishers whose policy say that certain high-quality advertisements won't be placed next to objectionable content are in fact receiving that level of service. In this case, the ad delivery infrastructure sends streams of URLs where the ads are being displayed to the compliance entity which will sample based on some acceptable strategy and direct a human to view the page at a given URL to determine the type of content the ad may have been displayed next to.

Enforcement

Preferably, a policy engine may modify interaction context to enforce certain policies. For example, currently many P3P engine would delete (or deny the ability to set) third party cookies if the user so requests. In another example, a policy engine may automatically delete known tracking cookies if a user requests that.

Some more complicated examples of policy enforcement require the introduction of intermediaries, which are protocol- and situation-specific. For example, it is relatively easy to enforce a cookie deletion/rejection policy if the policy engine runs on the user device (especially if it runs in its browser). However, if this is not the case, the only way to prevent cookies from getting set would be to introduce an intermediary where a policy engine can modify interaction context to affect this change. There are many ways this can happen with various trade-offs. In some situations, protocol security would prevent the deployment of transparent proxies. For example, HTTPS makes the data stream invisible to routers, etc. Therefore, a reliable HTTP solution would require the intermediary to be a target. The same situation may occur in other cases for various reasons.

Generally, an interaction which previously went from SourceA to TargetA has to be changed to one from SourceA to TargetB whose policy engine would typically eventually have an interaction with TargetA but will have full freedom to modify the interaction context of both interactions.

EXAMPLES

The following are some examples that demonstrate the advantages of the disclosed subject matter.

Opt-Out from Behavioral Advertising for the Web

The following is a simple example of how the disclosed architecture can be applied to the problem of opt-out of behavioral advertising on the Web.

User preferences with respect to opt-out are managed in a centralized policy store via a remotely accessible policy manager with a well-known URL controlled by an entity (UserInControl). UserInControl also runs a privacy manager allowing users to open accounts and manage their opt-out settings in one place. The privacy manager allows users the option of a global opt-out of any currently known and known in the future behavioral targeting programs.

The policy fragment preferably has one binary piece of data: whether a user chooses to opt out or not. The scope preferably applies to domains and IP addresses under the control of entities the user chooses to opt out of. The privacy manager simplifies the process of users identifying their opt-out scope, e.g., by showing known entity names and behind the scenes mapping those to a set of URLs. The opt-out statement preferably is encoded in two ways: (1) as an OPT-OUT cookie with name and value specifically formatted to match known entities expecting such cookies set for the domains the user has elected to opt-out of, and (2) as an opt-out header sent to request from those domains. UserInControl makes a reasonable effort to maintain an up-to-date registry of entities allowing opt-out via cookies and the specific format of these cookies that can be used by policy engines looking to encode the opt-out policy fragment in cookie form.

The ideal policy engine on the user side looks at the domain or IP address of an HTTP request and, based on that context and the user's policy, modifies the outgoing HTTP request to either add an opt-out cookie and/or an opt-out header and, if the user so requires, a global opt-out header (which will go out with every HTTP request). In addition, the ideal policy engine implementation preferably includes an HTTP header with a link to the user's policy manager at UserInControl. The policy engine may reject known tracking cookies for entities the user has opted out of even if there is no known way to communicate an opt-out request to those entities or if they have for some reason failed to act on the opt-out request.

Preferably, the implementation shows the user their opt-out status as he or she is navigating the Web.

Preferably, the policy engine is embedded in an intermediary on the user's device such as a browser plugin developed by UserInControl. In addition to offering the policy engine in the form of a plugin or other software integrated into an intermediary, UserInControl may offer a web page which through a series of HTTP requests (typically, appropriately parameterized redirects) to entities that (a) the user has chosen to opt out of and (b) support opt-out cookies installs these opt-out cookies on a user's device. In a way, the code behind this web pages acts as a crude policy engine.

It is desirable to execute this cookie opt-out code on a regular basis to ensure that the opt-out cookies do not expire. This can happen, for example, by making it easy to reach the code on the UserInControl opt-out web page.

Preferably, UserInControl also operates a registry where entities that support UserInControl's opt-out policy can identify themselves (entity name, URL scope, etc.). As part of the opt-out policy, UserInControl defines a policy manager API that provides information about opt-out policy form the perspective of the targeting entity (e.g., encoding and HTTP binding of the opt-out claim) as well as a profile manager API which can be used to query the opt-out status per entity. The latter requires a mechanism for identifying users. In the cases where user identification must happen through cookies, preferably the API requires issuing HTTP request(s) from the user's browser to the entity's domain such that the user's cookies related to this domain are passed. Those versed in the art would know how to parameterize such request(s) to establish a correlation in time between the UserInControl's user account and the profile of that user at other entities.

Entities that support UserInControl's opt-out policy may be required to support the opt-out header. To simplify implementation for vendors, UserInControl may offer (potentially open-sourced) code for (a) filters for common Web servers that either translate the HTTP opt-out header into an opt-out cookie or strip out tracking cookies when the header is present or (b) extensions for commonly deployed ad servers.

One proposed implementation has the following advantages:

It supports the existing opt-out cookie mechanism.

It allows for efficient and robust policy expression through an HTTP header.

It allows for user policy management by one or more potentially collaborating privacy managers and, as a result, makes it much easier to apply the same policy across devices and browsers.

Supports a number of specific implementation suggestions for deploying this approach to opting out broadly with minimal friction.

Extending to Other Environments

Consider the example where UserInControl wants to extend their opt-out program to cover advertising in SMS messages.

The opt-out policy fragment can be reused. One way that new entities will be added to the active scope of the policy would be via URIs targeting the space of SMS shortcodes and, if necessary, shortcode extensions. Due to shortcode reuse by different entities, it will be necessary to create a different mechanism also, one that is focused on the entities' identity (business name, brand name, etc.). Privacy managers supporting this policy would add appropriate UI to make it easy for users to provide their mobile number(s) and express their preferences.

SMS offers no good way for a user to communicate his or her policy. Therefore, entities that support this policy in the SMS domain would have to look up the user's policy via their mobile number. They can do this directly with UserInControl in the simplest form. Their lookup request identifies them with sufficient level of security such that information about the user's opt-out status can be made available to them. The lookup can be cached based on what the policy allows.

A global opt-out, because it is a simple binary piece of information, can be implemented even more simply in a manner similar to the mobile "do not call" list.

The proposed implementation has the following advantages:
- It enables opt-out for SMS, which is currently not available. This is enabled by the ability to query a user's policy out-of-band (outside the context of an interaction), and to have the results of that query affect the interaction.
- Users do not need to work with new entities.
- They can manage multiple devices easily and, if they so desire, apply the same policy to multiple devices.
- Global opt-out is very easy to implement and it requires no new entities other than UserInControl.
- UserInControl's registry is reused.

Requesting that Certain Types of Content to be Avoided

There are cases when users want certain types of content or advertising, e.g., objectionable content, to not be displayed. A policy fragment could be developed to communicate the preference. It can be scoped to the types of content in URI space (this assumes a mapping of categories, wherever they may come from, or even keywords to URI space which is easy to do for those versed in the art) and potentially to locations (URLs, shortcodes, etc.) also in URI space. Encodings and protocol bindings can be developed as before, e.g., via one or more HTTP headers of the same name whose values are one or more scope URIs. There is no need to change registries, policy managers, privacy managers or the deployment mechanisms and locations of policy engines. If the some policy engine implementations are generic-enough, e.g., knowing how to look at a policy fragment and map the scoped claim to one or more HTTP headers, they may be able to support this functionality on the user side without requiring a code update.

This example allows for some interesting uses of intermediaries. Consider the following situation. In a family, concerned parents can deploy technology that attempts to block adult content so that their underage children are not exposed to it. But people bringing their own computers to the home may not have such software installed and may expose the children to adult content. The likelihood of this happening can be diminished if a network intermediary, e.g., the home router, could augment HTTP requests with a header requesting that adult content is not returned. For example, this would automatically, temporarily, turn on safe search flags for compliant search engines even if the visiting friend hasn't explicitly requested that.

Of course, all types of opt-out policies can be reduced to a single opt-out policy that is scoped to different types of interaction context (actions such as behavioral advertising, certain content or advertising types and certain entities).

An implementation such as described has the following advantages:
- It provides a general-purpose mechanism to opt-out of any content type (or even more broadly, any aspect of interaction context).
- It leverages existing manager and engine deployments.
- It allows for policy enforcement through intermediaries in lieu of users' explicit policy definitions.

Adding Opt-In

So far the examples have been about avoidance and prevention or various forms of opt-out. The architecture also easily allows for opt-in scenarios.

Opt-in for certain types of content or advertising, essentially an expression of use preference, are trivially implemented in exactly the same way as opt-out for certain types of content. The logical difference is one bit—whether the content should be avoided or not. The new policy fragment can reuse the scoping model previously developed. Encodings and protocol bindings need only communicate that one bit of difference, e.g., through a different header name.

Opt-in more broadly may be associated with willingness to communicate some additional information about users. This is where user profile managers come in. The profile managers may be directly discoverable from interaction context or provided by the policy managers whose discoverability has already been discussed. For example, if a user opts-in to certain programs she may be willing to disclose her gender, age, zip code, etc. This information may be manually supplied by the user per opt-in entity or, for entities that know how to access the user's profile manager, the information may be supplied automatically or programmatically.

Security becomes a significant concern when sensitive information is stored in user's profiles managed by them. Deciding how much data to share preferably is determined by policy.

In addition, there are certain cryptographic approaches, typically associated with the DRM (Digital Rights Management) space, that could ensure that reasonably soon after a user revokes an opt-in the profile information they have shared which now may be stored or cached in profile stores managed by other entities could become unusable.

The implementation as described has the following advantages:
- It provides a general-purpose mechanism to opt-in in various contexts to various entities communicating either the simple fact of opt-in or, optionally, any other policy or profile information.
- It leverages existing manager and engine deployments.
- It suggests how certain cryptographic approaches could be applied to minimize profile leakage.

Privacy-Safe Ad Targeting

Sharing profile information as part of opt-ins requires trust. Keeping that profile information safe is no easy task and is fraught with risk. It may therefore be desirable to enable highly targeted advertising and content personalization without sharing profile data. This is equally true from a user's standpoint as it is from the standpoint of entities which have a lot of information about users and need to work with other players in the ecosystem. An example would be a mobile operator who has detailed PII about the owner of a phone plan as well as detailed location and other types of behavioral information.

This architecture can be integrated with such a privacy-safe ad targeting system. One such ad targeting system uses a synthetic construct, referred to as an audience certification assertion (ACA) or audience query tag (AQT), which is designed to be independent of any given request for an ad and any given consumer profile. A given ACA encapsulates a request or query for certain contextual, behavioral and/or demographic information into an opaque, effectively invisible token. In this manner, the privacy risk associated with such information is concentrated in the entity that creates and manages the ACA tokens. Advertisers create campaigns using the tokens, and ad serving technologies use the tokens to determine which ads to serve in response to given ad requests. The token certifies that the ad that is about to be displayed satisfies the targeting criteria associated with the request, and that the request has been satisfied in a privacy-safe manner.

Rather than indicating that profile data will be shared, a policy would identify the targeting engine (TE1) that provides privacy-safe ad targeting according to the technique described in the previous paragraph. When needing to target, an entity would have the choice of using its own targeting engine with whatever data it has available or using the TE1 identified in the policy. There is a third option also. The entity could contribute its profile information to the profile manager associated with TE1's entity. Typically, this would be a safe operation from a privacy standpoint as the entity operating TE1 would not share any profile information with anyone. Instead of passing profile data to inform a targeting decision, TE1 sends the assertions (as described) that the user satisfies a certain audience profile.

The implementation as described has the following advantages:
  It readily accepts integrations with privacy-safe ad targeting approaches.
  It leverages existing manager and engine deployments.

User-Configured Targeting Engines

An alternative to prevent profile data sharing is to include a targeting engine on user devices (or deployed at intermediaries) which is configured by users, regardless of which entity it is operated by. For example, at configuration time, such targeting engine presents users with a choice of sponsors they can pick from. While a given sponsor is active, the user is exposed to ads and/or content from that sponsor and affiliates.

A policy negotiation may be used to activating this type of targeting engine instead of the default targeting engine that the entity delivering the ads/content chooses to use. For example, if a user's policy specifies that they have this capability enabled on a given device under certain arrangements (compensation, for example) and if the interaction target's policy specifies that it is open to targeting engine replacement under certain arrangement (guaranteed minimum eCPM, for example) and if the policy engines determine that there is overlap in the arrangements, then the user-configured targeting engine may be activated.

For example, if Bob loves his Toyota Prius, he may prefer to elect Toyota as the sponsor of all auto-related sites he visits via the SponsorYourself ad network. The network guarantees $5 eCPM payout. If NewHybridVehicles.com's web site is willing to accept a targeting engine switch for payouts above $4 eCPM, the targeting engine switch can happen.

From an implementation standpoint, the switch can happen at any point in the interaction path. It can happen on the user's device, e.g., via modifying the contents of a Web page. It can happen at an intermediary. It can happen at the target by the target's ad server including an ad tag for the user's targeting engine.

The proposed implementation as described above has the following advantages:
  It readily accepts integrations with user-configured targeting engines.
  It allows for a policy negotiation between participants in interactions as to which targeting engine should be activated.
  It leverages existing manager and engine deployments.

Advantages—Summary

The techniques and architecture described herein have a number of advantages, including but not limited to:
  Teaching a simple, coherent and scalable approach for defining and enforcing policy related to targeting across domains, platforms, devices, protocols, interactions, content and media types.
  Integrating the notion of intermediaries into interactions.
  Providing an integrated approach that encompasses policy as well as profile information.
  Providing a mechanism for appropriate parts of a user's (consumer's) policy to be discovered and accessed in whole or in part by other parties in flexible ways, specifically, without requiring a direct request from a consumer device to these parties.
  Providing a mechanism for appropriate parts of a user's (consumer's) profile to be discovered and accessed in whole or in part by other parties in flexible ways, specifically, without requiring a direct request from a consumer device to these parties.
  Providing a simple, flexible and extensible notion of policy scoping.
  Providing an abstract processing model for determining actions related to interactions involving multiple policies.
  Providing for time-limited in addition to use-limited ways to use consumer policy and profile information.
  Providing a set of discovery services which automate policy and profile discovery both within and outside the context of a targeting interaction.
  Providing a coherent set of monitoring and enforcement strategies for policies, profiles and targeting.
  Providing for integration with privacy-safe ways to do targeting including but not limited to approaches that eliminate tracking and/or profile sharing and approaches that are user-configured.
  Suggests a simple, scalable approach to handling the pressing issue of behavioral targeting opt-out in the context of a future-proof architecture.

To reduce the costs of user management and to improve interoperability among enterprises, federated computing spaces have been created. A federation is a loosely-coupled affiliation of enterprises that adhere to certain standards of interoperability. The federation provides a mechanism for trust among those enterprises with respect to certain computational operations for the users within the federation. As one of ordinary skill in the art will appreciate, aspects of the disclosed architecture may be implemented across a "federation." Thus, for example, most ad networks, data aggregators, and ad exchanges store information about users to use for targeting more relevant ads. This information ranges from simple opt-out preferences, which will opt out a user from being tracked and/or targeting by an entity, to information about users' behaviors and interests. Managing these preferences is difficult. For example, there is no easy way for a consumer to opt out of tracking by a set of entities by policy, i.e., if a user wishes to allow tracking only by companies that do not share their data with third parties, the consumer would have to visit the privacy policy pages of multiple networks, digest that information, and opt-out individually of them by locating the opt out link on each of those companies' web sites. Although some companies are beginning to expose to users exactly what they know about them (and to offer consumers a way to add, delete, and edit that information), consumers still have to visit each of those companies' web sites separately to perform these actions. According to this disclosure, federated consumer preference management data is captured and maintained across mobile/online with respect to ad targeting information. In one embodiment, a federated API provides a toolkit that enables any third party to build consumer-facing transparency tools. An opt-out and preferences federation API is set of services that allow th8ird parties to build consumer-facing tools that help consumers manage these types of preferences globally (i.e., in one place and across all networks, exchanges, etc.).

In one embodiment, the subject disclosure relates to mobile device users, although this is not a limitation. As used herein, a "mobile device user" should be broadly construed. It includes any wireless client device, e.g., a cellphone, pager, a personal digital assistant (PDA, e.g., with GPRS NIC), a mobile computer with a smartphone client, or the like. A typical mobile device is a wireless access protocol (WAP)-enabled device (e.g., an iPhone®, a Blackberry® device, or the like) that is capable of sending and receiving data in a wireless manner using the wireless application protocol. The wireless application protocol ("WAP") allows users to access information via wireless devices, such as mobile phones, pagers, two-way radios, communicators, and the like. WAP supports wireless networks, including CDPD, CDMA, GSM, PDC, PHS, TDMA, FLEX, ReFLEX, iDEN, TETRA, DECT, DataTAC, and Mobitex, and it operates with many handheld device operating systems, such as PalmOS, EPOC, Windows CE, FLEXOS, OS/9, and JavaOS. Typically, WAP-enabled devices use graphical displays and can access the Internet (or other communication network) on so-called mini- or micro-browsers, which are web browsers with small file sizes that can accommodate the reduced memory constraints of handheld devices and the low-bandwidth constraints of a wireless networks. In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats.

Wireless device operating environments in which the subject matter may be implemented also are well-known. In a representative embodiment, a mobile device is connectable (typically via WAP) to a transmission functionality that varies depending on implementation. Thus, for example, where the wireless device operating environment is a wide area wireless network (e.g., a 2.5 G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the subject matter herein may be implemented in other (e.g., 3G) and next-generation mobile networks and devices as well. The mobile device is the physical equipment used by the end user, typically a subscriber to the wireless network. Typically, a mobile device is a 2.5 G- or 3G-compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like).

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the subject disclosure has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs on a web server (e.g., Apache) on a standard Intel hardware platform running an operating system such as Linux.

The invention may be practiced, typically in software, on one or more machines. Generalizing, a machine typically comprises commodity hardware and software, storage (e.g., disks, disk arrays, and the like) and memory (RAM, ROM, and the like). The particular machines used in the system are not a limitation of the present invention. A given machine includes network interfaces and software to connect the machine to a network in the usual manner. As described above, the subject matter may be implemented as a standalone product, or as a managed service (e.g., in an ASP model) using a set of machines, which are connected or connectable to one or more networks. More generally, the product or service is provided using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., AJAX technologies, Java applets or servlets, linkable libraries, native code, or the like, depending on platform), that provide the functionality of a given system or subsystem. As described, the product or service may be implemented in a standalone server, or across a distributed set of machines. Typically, a server connects to the publicly-routable Internet, a corporate intranet, a private network, or any combination thereof, depending on the desired implementation environment.

While given components of the system have been described separately, one of ordinary skill will appreciate that some of the functions may be combined or shared in given instructions, program sequences, code portions, and the like.

What is claimed is set forth below.

The invention claimed is:

1. Apparatus, comprising:

one or more processors; and computer memory holding computer program instructions that when executed by the one or more computer processors comprise (a) a policy manager, (b) a profile manager, and (c) a privacy-safe targeting engine;

the policy manager enabling a policy to be discovered and retrieved by an entity without a specific interaction between a user and the entity, the policy comprising a machine-executed data representation associated with one or more targeting interactions, the policy comprising data logically grouped in one or more URI-addressable fragments, wherein a policy fragment has an associated encoding and protocol-binding to enable the policy fragment to be accessed and applied;

the profile manager enabling one or more profiles to be accessed remotely; and the privacy-safe targeting engine using a policy fragment and an audience certification assertion (ACA) to make one or more choices about advertising or content delivery, the audience certification assertion encapsulating into an opaque data token one of: contextual, behavioral and demographic information, wherein the opaque data token certifies that an advertisement or content delivered in response to a request satisfies a targeting criteria associated with the request and that the request has been satisfied in a privacy-safe manner.

2. The apparatus as described in claim 1 wherein the computer program instructions also comprise a policy engine.

3. The apparatus as described in claim 2 wherein the targeting engine is user-configurable.

* * * * *